United States Patent Office 3,007,847
Patented Nov. 7, 1961

3,007,847
ANTISPASMODIC COMPOSITION
George Elwood Phillips, Morristown, and Jane Grant Lenahan, Florham Park, N.J., assignors to Warner-Lambert Pharmaceutical Company, Morris Plains, N.J., a corporation of Delaware
No Drawing. Filed May 8, 1956, Ser. No. 583,359
1 Claim. (Cl. 167—67)

This invention relates to improved compositions useful for the treatment of gastric ulcers and related conditions, wherein it is desirable to administer a parasympathetic depressant to reduce the secretion of gastric hydrochloric acid.

This application is a continuation-in-part of our copending application Serial Number 282,481, filed April 15, 1952, now abandoned.

It appears that the distress and other difficulties encountered by those suffering from gastric ulcers or related conditions to a very considerable extent are troublesome only when the pH of the stomach contents is below about 3.0, and it is under that condition that it is desirable to administer an antispasmodic, a parasympathetic depressant, to check the secretion of acid. Sufferers from gastric ulcers and related conditions seldom have the distressing symptoms when the pH of the stomach contents is above 3.0.

Such antispasmodics as atropine, homatropine methobromide and 2-diethylaminoethyl 9-xanthenecarboxylate methobromide are effective in checking the secretion of excess gastric hydrochloric acid and in affording relief to those suffering from the pains and spasms resulting from gastric ulcers or other gastric disturbances. In such cases, inasmuch as it is desirable to prevent such gastric disturbances, and because there is no practical means of predicting the exact time at which the suppression of gastric acid secretion will be required, antispasmodics are usually administered to patients on a routine basis. Consequently such patients usually have to take a larger amount of antispasmodics than they would if it were possible to predict when these drugs will actually be needed to prevent gastric distress. Unfortunately most antispasmodics cause undesirable side effects such as blurred vision, dryness of the mouth and skin, dizziness, headache, palpitation, nausea and vomiting.

The new products of the invention contain a basic antispasmodic, specifically an antispasmodic such as atropine, homatropine, 2-diethylaminoethyl 9-xanthenecarboxylate methobromide, 2-dimethylaminoethyl α-(1-hydroxycyclopentyl)phenylacetate, 3-(1 - piperidyl)-1-phenyl-1-cyclohexyl-1-propanol, 4-(α-phenylbenzylidene)-1,1-dimethylpiperidinium methylsulfate, 3-(1-piperidyl)-1-phenyl-1-cyclohexyl-1-propanol hydrochloride, and scopolamine methobromide, combined with a carboxylic acid cation exchange resin. These products have the unique property of maintaining the antispasmodic substantially completely adsorbed on the resin at pH values above about 3.0, while releasing the antispasmodic at lower pH values, specifically in the pH range of 1.0 to 3.0, which is the range of stomach acidity at which it is desirable to administer an antispasmodic and check the secretion of further acid. If the contents of the stomach remain at a pH above 3.0 little of the antispasmodic is released to the system, the rest is retained by the carboxylic acid cation exchange resin. If the pH of the stomach contents is below 3.0, the compositions release the antispasmodic which thereupon acts to check further acid secretion.

By the use of these compositions it is thus apparent that the potent antispasmodics are released for absorption into the system only at those times when they serve a really useful function. If their action is not required, they are not released from the resin and hence not absorbed by the system.

The use of ion exchange resins in the treatment of gastric ulcers and related conditions has been fairly widespread. However, the resins used in the prior art, have been anion exchange resins, which do not, and cannot, function as do the carboxylic acid cation exchange resins used in the new compositions. Furthermore, we have found that the use of the carboxylic acid cation exchange resins is critical. Other cation exchange resins, such as the sulfonic acid cation exchange resins, are unsuitable and inoperative as substitutes for the carboxylic cation exchange resins used in the compositions of our invention, as demonstrated by experimental data tabulated hereinbelow.

The carboxylic acid type cation exchange resins are well known and many are available commercially and are used for a variety of purposes. They possess a common characteristic in that their ion exchange property is dependent upon the presence of carboxyl groups in the resin structure. They are generally prepared either by condensation of a phenolic carboxylic acid with an aldehyde or by the copolymerization of a polymerizable acid with a divinyl compound. Resins of this type are described in U.S. Patents Nos. 2,319,359; 2,333,754; 2,340,-110; 2,340,111; and 2,541,420. In the preparation of the compositions of our invention, the carboxylic acid cation exchange resins are used in the alkali metal cycle. See "Ion Exchange Resins," Kunin and Myers, 1950. They will selectively and almost completely adsorb basic antispasmodics such as atropine, homatropine and 2-diethylaminoethyl 9-xanthenecarboxylate methobromide from their aqueous solutions. The adsorption refers, of course, to adsorption of the cation of the antispasmodic, that is, of atropine free base from a solution of atropine sulfate, homatropine methyl ion from a solution of homatropine methobromide and 2-diethylaminoethyl 9-carboxylate methyl ion from a solution of the corresponding methobromide and the like. When the antispasmodic is released in the stomach, by what in effect corresponds to elution, it is presumably released as the chloride or hydrochloride.

In preparing the new compositions we have found it advantageous to buffer the resin to a pH of about 3.5 to 5.0 with sodium acetate-acetic acid buffer, and after washing the resin, to use it to adsorb the antispasmodic from an aqueous solution of a soluble salt thereof. Adsorption is quite complete.

A desirable product contains 1 mg. of atropine per gram of complex or 10 mg. of any of the other antispasmodics mentioned per gram of complex. The dose is then about 300 mg. of complex every 3–5 hours.

The ion exchange resins which are preferred in the compositions of this invention are copolymers of acrylic or methacrylic acid and divinylbenzene wherein the divinylbenzene component constitutes from 2.5% to about 5% of the resin composition. A resin of this type which we have found to be a very satisfactory component of the compositions of our invention is the ion exchange resin known as IRC–50. This resin is commercially available as a moist product which loses about 30–40% of its weight upon drying at 37° C. If 1 mg. of atropine per gram of complex is desired the following procedure is carried out. A convenient amount of IRC–50 is converted to the free base and stirred with a buffer at pH 4.7. The buffer is removed, the wet resin is weighed and a portion is dried at about 37° C. The amount of wet resin which gives the desired amount of dried resin is then stirred with the calculated amount of atropine sulfate solution. The resin is then removed, washed with water and dried. For example, the resin is stirred with pH 4.7 buffer, removed, washed and allowed to drain. Drying at 37° C. shows 40% loss of weight. One hundred sixty-seven grams of the moist resin is then stirred with 100 ml. of atropine sulfate solution containing 117 mg. atropine sulfate (equivalent to 100 mg. atropine free base). The resin is removed and dried. Each gram of resin contains 1 mg. of atropine; or 167 g. of moist resin is stirred with 100 ml. of an aqueous solution containing 1280 mg. homatropine methobromide. The resin is removed and dried. Each gram of complex contains 10 mg. homatropine methyl ion.

The invention will be illustrated by the following specific examples but it is not limited thereto.

EXAMPLE I

One hundred twenty-five grams of a commercially available carboxylic acid cation exchange resin (IRC–50) was stirred with 200 ml. of 4% sodium hydroxide solution, filtered and washed with water. The resin, now in the sodium cycle, was stirred with sodium acetate-acetic acid buffer solution (pH 4.7) several times and finally washed with water. It was then stirred with about 50 ml. of an aqueous solution containing 20.75 mg. of atropine sulfate. The resin was removed by filtration and dried at 37° C. yielding 105 g. of complex containing about 0.16 mg. of atropine free base per gram. Analysis of the filtrate indicated substantially complete adsorption of the atropine on the resin.

EXAMPLE II

Fifteen grams of a commercially available carboxylic acid cation exchange resin (IRC–50) was stirred with 200 ml. of 4% sodium hydroxide solution, filtered and washed with water. The resin, now in the sodium cycle, was stirred with sodium acetate-acetic acid buffer solution (pH 4.7) several times and finally washed with water. It was then stirred with 50 ml. of an aqueous solution containing 84 mg. atropine sulfate. After filtration, the filtrate was found to contain 1.7 mg. of atropine sulfate. The resin was dried at 37° C. The final product weighed 9 g. and contained 7.8 mg. atropine free base per gram.

EXAMPLE III

Fifty grams of the same carboxylic acid cation exchange resin as was used in Example I was treated with 150 ml. of 4% sodium hydroxide solution giving a mixture having a pH of 7.9. The resin was removed, washed, stirred with sodium acetate-acetic acid buffer at a pH of 3.5 and again washed. It was then stirred with 50 ml. of an aqueous solution containing 9.3 mg. of atropine sulfate. 1.5 mg. of the atropine sulfate was not adsorbed. The resin was separated by filtration and dried at 37° C. yielding 28 g. of a product containing 0.23 mg. of atropine free base per gram.

EXAMPLE IV (A) One hundred ten grams of carboxylic cation exchange resin as was described in Example I was converted to the sodium cycle with 4% sodium hydroxide, washed and stirred with sodium acetate-actic acid buffer at a pH of 4.7 and again washed. It was then stirred with 50 ml. of an aqueous solution containing 40 mg. homatropine methobromide. Adsorption of the homatropine methyl ion was substantially complete. The resin was removed, washed with water and dried at 37° C. The product weighed 65 g. and contained 0.5 mg. homatropine methyl ion per gram of resin.

(B) A similar product containing 17 mg. homatropine methyl ion per gram was prepared in the same way, using a solution containing 115 mg. of homatropine methobromide in 50 ml. of water.

EXAMPLE V

Two grams of the same carboxylic acid cation exchange resin as described in Example I was converted to the sodium cycle and washed with sodium acetate-acetic acid buffer as previously described. The resin was removed, washed and stirred with 25 ml. of a solution containing 25 mg. of 2-diethylaminoethyl 9-xanthenecarboxylate methobromide. The resin complex was then removed from the solution. Adsorption of the antispasmodic was substantially complete and the resulting product contained about 10.2 mg. of 2-diethylaminoethyl 9-xanthenecarboxylate free base per gram of undried product.

By substituting the antispasmodics used in the foregoing examples by other suitable antispasmodics, comparable antispasmodic-cation exchange resin complexes may readily be obtained. Specific examples of said suitable antispasmodics are 2-dimethylaminoethyl α-(1-hydroxycyclopentyl)phenylacetate, 3-(1-piperidyl)-1-phenyl-1-cyclohexyl - 1 - propanol, 4 - (α - phenylbenzylidene) - 1,1-dimethylpiperidinium methylsulfate, 3-(1-piperidyl)-1-phenyl-1- cyclohexyl-1-propanol hydrochloride, and scopolamine methobromide.

The following data illustrate the effectiveness of the new products in retaining the antispasmodic on exposure to aqueous media at pH above about 3.0 and in releasing it at lower pH values. In Table I the product is that of Example II above. Five grams of complex, containing 7.8 mg. of atropine free base per gram was stirred with a measured amount of aqueous hydrochloric acid of the specified normality, the solution was filtered, the pH measured and the nitrogen determined by micro-Kjeldahl. This was repeated with successive elutions as shown in the table. The percent recovery shown is cumulative.

In Table II the product is that of Example IV (part B) above. Five grams of resin complex, containing 85 mg. homatropine free base, was eluted with successive portions of aqueous hydrochloric acid as shown in the table. The percent recovery shown is cumulative.

In Table III the product is that of Example V above. Two grams of resin complex was eluted with aqueous hydrochloric acid in the same manner as described above. The percent recovery shown is cumulative.

*Table I*

| Volume of HCl | pH | Percent Recovery of antispasmodic (cumulative) |
|---|---|---|
| 100 ml. 0.01 N | 5.3 | 0 |
| 100 ml. 0.01 N | 5.0 | 0 |
| 50 ml. 0.01 N | 4.9 | 1.5 |
| 20 ml. 0.01 N | 4.5 | 1.5 |
| 50 ml. 0.01 N | 4.1 | 3.0 |
| 50 ml. 0.01 N | 3.4 | 6.0 |
| 70 ml. 0.01 N | 2.5 | 27 |
| 100 ml. 0.05 N | 1.7 | 60 |
| 100 ml. 0.05 N | 1.6 | 76 |
| 100 ml. 0.10 N | 1.1 | 92 |

*Table II*

| Volume of HCl | pH | Percent Recovery of antispasmodic (cumulative) |
|---|---|---|
| 100 ml. 0.01 N | 4.1 | 10 |
| 50 ml. 0.01 N | 2.8 | 34 |
| 50 ml. 0.01 N | 2.5 | 62 |
| 50 ml. 0.1 N | 1.5 | 80 |
| 50 ml. 0.1 N | 1.5 | 87 |

Table III

| Volume of HCl | pH | Percent Recovery of antispasmodic (cumulative) |
|---|---|---|
| 25 cc. 0.01 N | 4.7 | 2.55 |
| 25 cc. 0.01 N | 3.8 | 11.0 |
| 25 cc. 0.01 N | 2.4 | 34.7 |
| 25 cc. 0.01 N | 1.5 | 54.6 |
| 50 cc. 0.1 N | 1.5 | 62.3 |
| 25 cc. 0.1 N | 1.5 | 67.4 |
| 25 cc. 0.1 N | 1.5 | 73.4 |

In Table IV below, the product evaluated was prepared by stirring IR–120, which is a commercially available sulfonic acid cation exchange resin, with 50 ml. of an aqueous solution containing 16 mg. of atropine sulfate (this corresponds to 0.8 mg. of nitrogen), whereafter the suspension was filtered and the isolated atropine-sulfonic acid ion exchange complex was treated with successive portions of aqueous hydrochloric acid. As may be seen by inspection of the data of Table IV, no elution of atropine from the resin complex was obtained even at a pH as low as 1.2. Substantially identical results were obtained when the resin IR–120 was replaced by the resin IR–105 which is another commercially available sulfonic acid cation exchange resin.

Table IV

| Volume of HCl | pH | Percent Recovery of antispasmodic (cumulative) |
|---|---|---|
| 100 ml. .01 N | 3.2 | 0 |
| 100 ml. .01 N | 2.7 | 0 |
| 100 ml. .05 N | 1.6 | 0 |
| 50 ml. .10 N | 1.2 | 0 |

The above results demonstrate that at pH levels corresponding to high gastric acidity, an antispasmodic adsorbed on a cation exchange resin will or will not be released from said resin according as said resin is the carboxylic acid type or the sulfonic acid type respectively.

We claim:

An antispasmodic composition exhibiting antispasmodic activity at a pH below 3 consisting of a carboxylic acid cation exchange resin comprising a copolymer of methacrylic acid with about 5% of divinyl benzene having an antispasmodic cation adsorbed thereon, said cation being that of an antispasmodic of the group consisting of atropine, homatropine, 2-diethylaminoethyl-9-xanthenecarboxylate, 2 - diethylaminoethyl-α-(1-hydroxycyclopentyl)-phenylacetate, 3-(1-piperidyl) - 1 - phenyl-1-cyclohexyl - 1 - propanol, 4-(α-phenylbenzylidene)-1,1-dimethylpiperidine and scopolamine.

References Cited in the file of this patent

UNITED STATES PATENTS

| 2,498,687 | Larsen | Feb. 28, 1950 |
| 2,776,240 | Shortridge | Jan. 1, 1957 |

OTHER REFERENCES

Segal et al.: reprint from Gastroenterology, vol. 16, No. 2, October 1960, pp. 380–386.

Winters: reprint from Drug and Allied Industries, July 1960, pp. 1–6.

American Journal of Pharmacy, February 1950, pp. 48–50.

Industrial and Engineering Chemistry, vol. 41, No. 3, March 1949, pp. 462–463.

Martin: Ion Exchange and Adsorption Agents in Medicine, Little, Brown and Co., Boston, 1955, pp. 63, 64 and 113.

Amberlite I.R.C. 50, Rohm and Haas Co., Philadelphia, pub. April 1958, pp. 5–9.

Amberlite I.R.C. 50(h) Analytical Grade, Rohm and Haas Co., Philadelphia, pub. 1949 (revised September 1950), pp. 1 and 2. (Compiled in the notebook Amberlite Ion Exch. Resins.)

Danowski: J. of Clinical Investigation, September 1951, pp. 979–980.